United States Patent [19]

Jones

[11] Patent Number: 4,577,433
[45] Date of Patent: Mar. 25, 1986

[54] SNELLED HOOK, FLY, AND LURE HOLDER

[76] Inventor: Earl C. Jones, P.O. Box 123, Horeshoe Bend, Id. 83629

[21] Appl. No.: 362,231

[22] Filed: Apr. 21, 1982

[51] Int. Cl.$^4$ ............................................. A01K 97/06
[52] U.S. Cl. ...................................................... 43/57.2
[58] Field of Search .................. 43/57.1, 57.2; 402/12, 402/8, 74; 281/1 R, 15 R, 49

[56] References Cited

U.S. PATENT DOCUMENTS

| | | | |
|---|---|---|---|
| 1,133,846 | 3/1915 | Fath | 43/57.2 |
| 2,566,388 | 9/1951 | Waggoner | 43/57.2 |
| 2,572,703 | 10/1951 | Dennis | 281/1 |
| 2,659,997 | 11/1953 | Guestinger | 43/57.2 |
| 2,879,619 | 3/1959 | Peterson | 43/57.2 |
| 3,758,977 | 9/1973 | Miller | 43/57.1 |

Primary Examiner—Nicholas P. Godici
Assistant Examiner—Marc Hodak

[57] ABSTRACT

A compact and convenient fishing lure and leader holder comprising rigid fiberglass pages contained in a looseleaf type binder. The pages have corresponding sets of notches along the upper and lower edges, and a series of appropriately spaced rubber bands wrapped around them parallel to the notched edges. Fishing hooks, flies or lures with attached leaders are easily secured to the pages by looping the eye at the end of a leader around the tabs formed between the notches and then wrapping the leader around the pages through the notches. Hooks at the other end of the leaders are secured by hooking them over the appropriate rubber band. An alternative embodiment of the invention has two sets of corresponding rivets protruding from the flat side of each end of the pages, whereby the eye of a leader is looped over a protruding rivet with the remainder wrapped in a skein between two corresponding rivets. The hook is again attached to one of the rubber bands. The second embodiment of the invention provides a system including a cord passing through a central pivot point in a cover and page arrangement. The cord is long enough to fit around the neck and dangle the lure holder at about chest level for convenient access by the wearer. Pages pivot about the cord in and out of the cover for easy storage of and access to fishing lures.

11 Claims, 5 Drawing Figures

SNELLED HOOK, FLY, AND LURE HOLDER

FIELD OF THE INVENTION

This invention relates to a snelled fishing lure carrying and storing device. More specifically, the invention is a fish hook and leader book wherein fishing lures and attached leaders may be easily stored in a compact book form. The book is easily carried and the hooks and lures may be easily removed from and inserted into the book.

BACKGROUND OF THE INVENTION

There already exist many devices for storing and carrying fish hooks and lures. Such devices must protect the sharp hook as well as provide a way to store the leader attached to the hook in a fashion that won't become tangled. One method of accomplishing this is illustrated in a Leader Holder by C. W. Newell, U.S. Pat. No. 2,730,833, dated Jan. 17, 1956. In this design, a leader is wrapped around a cord or plate, with the plate having notches on either side to secure the leaders. The plate is trapezoidal in shape so that if the leader is the wrong length to be accommodated at one point on the card, it can be moved to a different place on the trapezoid where it will fit.

Newell has the disadvantage that the fisherman in the field may waste a great deal of time wrapping and unwrapping the lure until he finds a place on the card where it will properly fit. The is because the points of attachment lack the flexibility to be moved to meet the hook. Also, Newell shows a card for carrying the leaders attached to it, but does not provide satisfactory means for transporting the card without damaging the leaders and hooks fastened to them.

Because of the fragile nature of the hook and fly arrangement in many lures, a device for carrying them must protect them from damage. One method proposed is shown in the Fish Hook Holder by M. E. Kline, U.S. Pat. No. 3,115,723, patented Dec. 31, 1963. In that patent, the lures are fastened to a corregated sheet and the sheet may be rolled up, or a cover may be folded over. Kline, however, has the disadvantage that it does not accommodate a great variety in lengths of leaders. Specifically, the device shown in Kline will not accommodate leaders that are either too long or too short. If the lines are too short, they will not even fit in the carrying device. And if they are too long, they will flop around and become entangled in the other lines or the hooks and lures.

BRIEF DESCRIPTION OF THE INVENTION

An object of this invention is to provide an improved method for carrying, storing and holding a wide variety of fishing lures with leaders of any practical length attached. It is a further object and purpose of this invention to provide a means whereby fish hooks and leaders may be easily removed from their holder without entanglement, and without fear of dropping and losing both holder and lures.

An additional object and feature of this invention is to provide a way of carrying a large number and selection of snelled fishing lures conveniently so as to be readily available as a fisherman might need them.

Another object and purpose of the invention is to provide a means for storing and removing from storage lures, without entanglement with other leaders and hooks.

Briefly, the above purposes of the invention are accomplished with rigid rectangular shaped cards or plates, called "pages." These pages have corresponding sets of notches and tabs at two opposite sides of the rectangular shape. Eyes of fishing snells can be looped over the tabs and the remainder of skeins of leader wrapped around the cards along one length and secured in the notches of the cards. A series of appropriately spaced rubber bands running transverse to the leader provides a stretchable, flexible means upon which the hook of the leader may be fastened securely, and easily unfastened and removed.

An alternative form of the page comprises a rigid plate with corresponding sets of rivets protruding from the flat sides and near two opposite ends, with the leader being wrapped around corresponding pairs of rivets. Again, rubber bands run transverse to the leader wrapped between corresponding rivets, providing a flexible means of attachment for hooks and leader, whereby the point of attachment may accommodate any length of leader and hold the leader taut.

A series of pages may be contained in a looseleaf type notebook, wherein the pages may be removed or inserted, and the number of pages may be increased or decreased. This allows the user to select a particular array of snelled flys, hooks, or lures, which he or she may wish to carry on any given occasion. An array attached to a page may be easily placed in or removed from a notebook. Further it allows for a large number of snelled lures to be carried in a compact, convenient holder. The size of the looseleaf notebook and its pages may be varied, depending upon the size most convenient and the type of lures the fisherman is using.

Pages utilizing rivets, as described above, may be attached to a cover which appears to be similar to a looseleaf from the outer portion, but which secures a series of pages in the cover about a central pivot point in the top of the cover and the top of the pages. A long cord passes through the pivot point in the cover and through each of the pages. The cord is long enough to be worn around the neck so as to be readily accessible by the user. Each individual page pivots out of the cover and the lures can be quickly and easily attached and detached.

Other objects, features, and advantages will become apparent in the detailed description of the drawings.

DETAILED DESCRIPTION OF THE INVENTION

Figure 1:
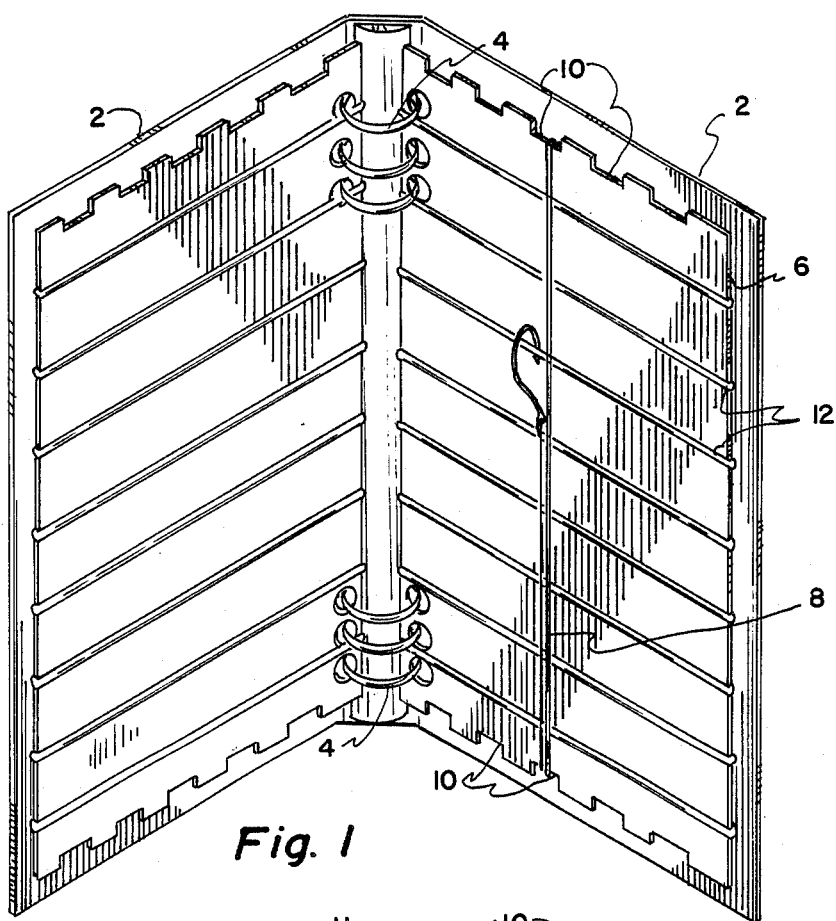
FIG. 1 shows a first embodiment of the invention, with a looseleaf type holder containing notched plates having rubber bands running transverse to fishing leaders wrapped between corresponding notches.

Turning first to FIG. 1, a cover and ring means, such as a common looseleaf having a cover and rings, is shown. The rings are attached to the spine of the looseleaf, and may be opened and closed to allow insertion and removal of plates 6. Plates 6 are also referred to as "pages."

The rings 4 are large enough to accommodate one or more of the pages 6. The sides 2 of the looseleaf arrangement pivot about the spine of the cover and when closed compress the pages of the looseleaf into a compact arrangement.

Fishing hooks and leaders 8 are secured and stored by looping the eye 7 at the end of leader 8 over tabs 9, then wrapping the remaining leader 8 around page 6 through corresponding notches 10. Hooks 13 may be hooked over appropriate rubber bands 12 which stretch to meet the hooks and thereby keep leaders 8 taut.

In order to accommodate more lures, additional pages may be added to the looseleaf binder. Also, various pages 6 may be exchanged in the arrangement to allow for variation in the assortment of lures.

Figure 2:
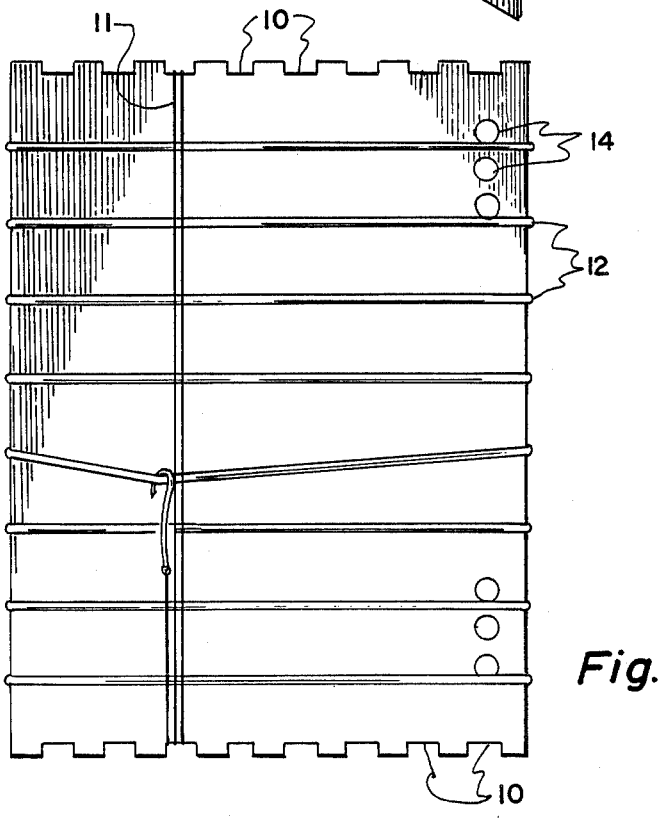
FIG. 2 shows an individual plate, or page, as contained in the looseleaf type holder of FIG. 1.

FIG. 2 shows a single page 6, together with a lure 8 wrapped through the notches 10. Holes 14 are provided in the page to accommodate rings in the looseleaf binder. A series of appropriately spaced rubber bands 12 run transverse to the leader 11 wrapped through the corresponding notches 10. The number and size of the rubber bands will vary according to the size of pages 6 and the strength desired. The pages 6 may be made from plastic, fiberglass or rigid or semi-rigid material. Such material might be fiberglass sheeting 0.05 inches thick.

Each page 6 may accommodate several lures, depending upon the size of the page, the distance between the notches 10, and the bulkiness of the lures placed on the pages 6.

Figure 3:
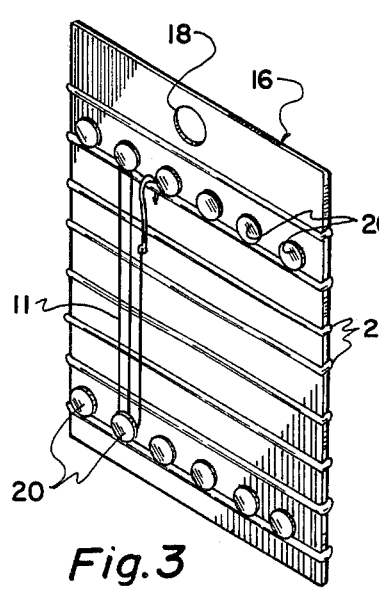
FIG. 3 shows an alternative page wherein corresponding sets of rivets are attached at two opposite ends of the page and protrude from either side of the page.

FIG. 3 shows a page of an alternative embodiment of the invention. The page 16 may also be made of a rigid or semi-rigid material as previously described in FIG. 2. A hole 18, centered between two sides, is provided at the top of the page 16, and rivets protrude at two opposite sides of the page 16. Corresponding sets of rivets 20 protrude from either side of the page 16, and rubber bands 22 are provided which run parallel to the corresponding sets of rivets 20 at opposite ends of the page 16. Eyes of leaders 17 are looped over rivets 20, with the remaining leader wrapped around opposite rivets 20 as shown in FIG. 3, with hooks 19 being hooked over a rubber band 22 stretched slightly to meet the hook 19 and keep the line taut.

Figure 4:
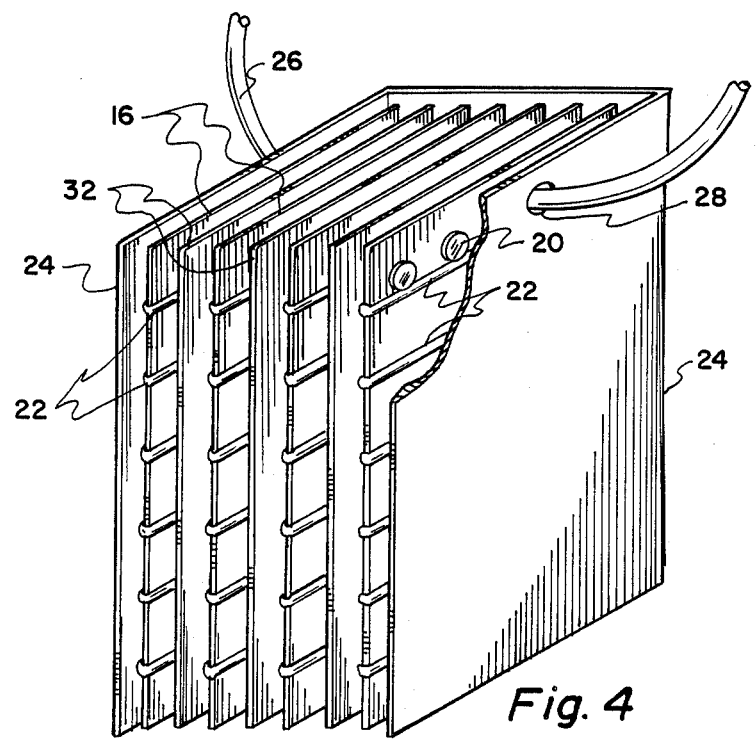
FIG. 4 shows the pages of FIG. 3 in a cover with a long cord passing through the cover and each of the pages. The cord is shown long enough to attach around a fisherman's neck and be worn at a length comfortable to reach with the hands.

FIG. 4 shows a multiplicity of pages 16 enclosed in a cover 24. The cover may be made from flexible plastic sheeting. A cord 26 passes through holes 28 in the cover and holes 18 in each of the pages, thereby securing the arrangement in a compact easy to carry fishing lure storage container. The pages 16 pivot about the cord 26, such that a page may be rotated out of the carrier 24 and leader may be wrapped around the rivets 20, with hooks being hooked over the rubber bands 22 as previously described.

The cord 26 is long enough to be worn around the neck with the arrangement of FIG. 4 being worn about mid-chest level by the wearer. This way, the wearer can easily insert or remove fishing lures from the holder. This embodiment can thereby be easily carried where the wearer has convenient access.

Figure 5:
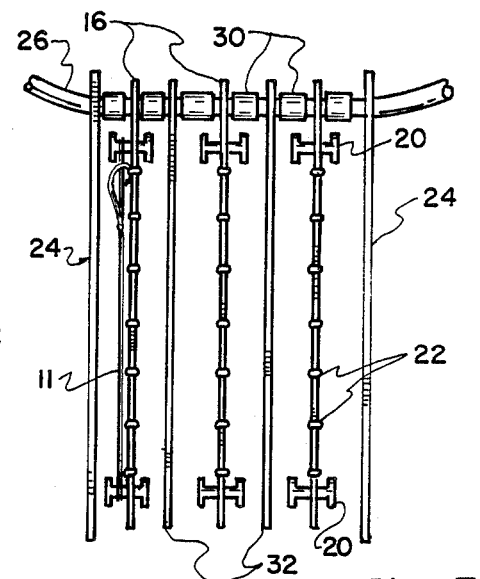
FIG. 5 is a front view of the cover and pages shown in FIG. 4, showing the spacers, pages with rivets, and outside cover, with the cord passing through the arrangement.

FIG. 5 is a front view of the embodiment shown in FIG. 4. The cord 26 passes through the cover 24 and each of the pages 16. Separators 32 are provided between each of the pages 16 to prevent the lures from adjacent pages 16 from becoming entangled in each other. These separators may also be made from a material similar to the pages 16.

Spacers 30 are provided between the separators 32 and the pages 16. These spacers are to allow for easy manipulation of the pages, and to prevent the arrangement from becoming compressed together and damaged.

The number of pages 16 enclosed in this embodiment of the invention may vary, depending upon the size and assortment of lures which is desired. Also, the sizes of the pages and cover may vary depending upon what is convenient and functional for the user.

Changes and variations may be made to above embodiments of my invention and still be within its scope and spirit. For example, features may be added to further increase its utility, and adaptations of the invention may be made to carry other than just fishing lures and leader. Also, stretchable means other than rubber bands may be used to provide the flexible points of attachment for hooks and lures.

I claim:

1. A compact and convenient fishing lure and leader holder comprising:
    a substantially flat rectangular plate having a multiplicity of corresponding notches located along two opposite edges; and
    a series of appropriately spaced rubber bands wrapped around said plate substantially parallel to the notched edges, whereby fishing snells may be wrapped around the plate through the corresponding notches and hooks and loose ends attached to or tucked under the rubber bands, thereby securing snelled lures to the plate.

2. The holder described in claim one further comprising:
    one or more holes in said plate located toward one side, and
    ring and cover means having rings that open and close for receiving said plates through said holes whereby the plate or a multiplicity of plates may be attached to the ring and cover means like a book.

3. The holder described in claim 2 wherein said ring and cover means includes a looseleaf binder.

4. A compact and convenient fishing lure holder comprising:
    one or more rigid substantially flat rectangular plates;
    a multiplicity of corresponding notches located along two opposite edges of said plate whereby fishing leader wrapped around said plate pass through said notches and are prevented from moving laterally on the plate;
    a multiplicity of rubber bands wrapped around said plate and running substantially transverse to fishing leaders wrapped through said corresponding notches;
    one or more holes through said plates, the hole or holes being located near an edge of the plates; and
    ring and cover means having rings that open and close for receiving and securing said plates through said holes in the plates whereby a plate or multiplicity of plates may be contained in said ring and cover means like pages in a book.

5. A compact and convenient fishing lure holder comprising:
- one or more substantially flat and rectangular rigid plates;
- a multiplicity of corresponding rivets located near two opposite edges of each of said plates, said rivets protruding from at least one side of said plates, whereby fishing leaders may be wrapped around said plates;
- stretchable means attached to said plates for securing loose ends and hooks attached to said leaders;
- cover means for receiving said plates with said rivets attached; and
- a cord passing through a pivot point toward an upper edge in said cover means and said plates whereby the plates may be rotated out of said cover means to expose said rivets of the plates, thereby allowing easy access to lures stored on the plates.

6. The holder described in claim 5 wherein said stretchable means includes a series of appropriately spaced rubber bands wrapped around said plates.

7. The holder described in claim 5 further including separating means between said plates in said cover means for separating adjacent plates and rivets.

8. The holder described in claim 7 wherein said separating means includes substantially flat rectangular plates between said plates.

9. The holder described in claim 7 wherein said separating means includes spacer rings between said plates which said cord passes through.

10. The holder described in claim 5 wherein the two ends of said cord are fastened together to form a continuous cord, and wherein said cord is of proper length around the neck of a user and dangle said holder at a convenient position for the user.

11. A compact and convenient fishing lure and leader holder comprising:
- one or more substantially flat and rectangular rigid plates;
- a multiplicity of corresponding rivets located near two opposite edges of each of said plates, said rivets protruding from at least one side of said plates, whereby fishing lures may be wrapped around said corresponding opposite rivets and thereby attached to said plates;
- a series of appropriately spaced rubber bands wrapped around said plates; cover means for receiving said plates with said rivets attached;
- a cord passing through a pivot point towards an upper edge of said cover means and of said plates whereby the plates may be rotated out of said cover means to expose said rivets of the plates; and
- separating means between said plates in said cover means for separating adjacent plates and rivets.

* * * * *